US006493656B1

(12) United States Patent
Houston et al.

(10) Patent No.: US 6,493,656 B1
(45) Date of Patent: Dec. 10, 2002

(54) DRIVE ERROR LOGGING (75) Inventors: Akil Houston, Houston, TX (US);
Thomas R. Lenny, Longmont, CO (US)

(73) Assignee: Compaq Computer Corporation, Inc., Houston, TX (US)

( * ) Notice: Subject to any disclaimer, the term of this patent is extended or adjusted under 35 U.S.C. 154(b) by 0 days.

(21) Appl. No.: 09/259,622

(22) Filed: Feb. 26, 1999

(51) Int. Cl.[7] .......................... G06F 15/00; G06F 17/40
(52) U.S. Cl. ........................................ 702/187; 714/5
(58) Field of Search ............................ 702/187, 79, 58, 702/113, 182, 183, 185; 700/9; 717/11; 714/42, 48, 5, 7

(56) References Cited

U.S. PATENT DOCUMENTS

| | | | |
|---|---|---|---|
| 3,704,363 A | 11/1972 | Salmassy et al. | 235/153 |
| 4,268,905 A | 5/1981 | Johann et al. | 364/200 |
| 4,348,761 A | 9/1982 | Berger | 371/21 |
| 4,725,968 A | 2/1988 | Baldwin et al. | 364/550 |
| 4,841,389 A | 6/1989 | Hoyt et al. | 360/75 |
| 4,979,055 A | 12/1990 | Squires | |
| 5,067,128 A | 11/1991 | Nakane | 371/5.5 |
| 5,361,346 A | 11/1994 | Panesar | |
| 5,367,670 A | 11/1994 | Ward et al. | 395/575 |
| 5,371,882 A | 12/1994 | Ludlam | 395/575 |
| 5,390,187 A * | 2/1995 | Stallmo | 714/7 |
| 5,410,439 A | 4/1995 | Egbert et al. | 360/75 |
| 5,422,890 A | 6/1995 | Klingsporn et al. | 371/21.6 |
| 5,450,579 A * | 9/1995 | Johnson | 709/321 |
| 5,469,463 A | 11/1995 | Polich et al. | 395/182.18 |
| 5,471,617 A | 11/1995 | Farrand et al. | 395/700 |
| 5,483,641 A * | 1/1996 | Jones et al. | 710/3 |
| 5,500,940 A | 3/1996 | Skeie | 395/183.18 |
| 5,539,592 A | 7/1996 | Banks et al. | 360/75 |
| 5,557,183 A | 9/1996 | Bates et al. | 318/434 |
| 5,559,958 A | 9/1996 | Farrand et al. | 395/183.03 |
| 5,566,316 A | 10/1996 | Fechner et al. | 395/182.04 |
| 5,568,608 A * | 10/1996 | Shannon | 714/44 |
| 5,611,069 A | 3/1997 | Matoba | |
| 5,617,425 A * | 4/1997 | Anderson | 714/10 |
| 5,737,519 A | 4/1998 | Abdelnour et al. | 395/183.15 |
| 5,761,411 A | 6/1998 | Teague et al. | 395/184.01 |
| 5,819,109 A * | 10/1998 | Davis | 710/15 |
| 5,828,583 A | 10/1998 | Bush et al. | 364/551.01 |
| 5,917,724 A * | 6/1999 | Brousseau et al. | 700/81 |
| 5,935,260 A * | 8/1999 | Ofer | 714/42 |
| 2001/0042225 A1 | 11/2001 | Cepulis | |

OTHER PUBLICATIONS

Predictive Failure Analysis,: IBM Corporation, believed to be made public Nov. 1994.
Blachek, Michael D. and Iverson, David E.; "Predictive Failure Analysis–Advanced Condition Monitoring," IBM Corporation, believed to be made public Nov. 1994.
Colegrove, Dan; "Informational Exception Condition Reporting," ATA–3 Proposal (X3T10/95–111r1), IBM Corporation; Mar. 1, 1995.

* cited by examiner

Primary Examiner—Bryan Bui
Assistant Examiner—Demetrius Pretlow
(74) Attorney, Agent, or Firm—Sharp, Comfort, & Merrett, P.C.

(57) ABSTRACT

A method and apparatus for logging errors in a storage device. As commands are executed by the storage device a list of previously executed commands is maintained. When an error is detected by the storage device, the previously executed commands and certain error condition codes are stored in an error log in a non-volatile memory of the storage device. The storage device is responsive to a command for reading back the values contained in the error log for diagnostic purposes.

24 Claims, 10 Drawing Sheets

| REGISTER | 7 | 6 | 5 | 4 | 3 | 2 | 1 | 0 |
|---|---|---|---|---|---|---|---|---|
| FEATURES | D0h ||||||||
| SECTOR COUNT | | | | | | | | |
| SECTOR NUMBER | | | | | | | | |
| CYLINDER LOW | colspan 4Fh ||||||||
| CYLINDER HIGH | C2h ||||||||
| DEVICE/HEAD | 1 | | 1 | D | | | | |
| COMMAND | B0h ||||||||

| DATA REGISTER | 7 | 6 | 5 | 4 | 3 | 2 | 1 | 0 |
|---|---|---|---|---|---|---|---|---|
| DATA0 | b7 | b6 | b5 | b4 | b3 | b2 | b1 | b0 |
| DATA1 | b15 | b14 | b13 | b12 | b11 | b10 | b9 | b8 |

| STATUS REGISTER |||| ERROR REGISTER ||||
|---|---|---|---|---|---|---|---|
| DRDY | DF | CORR | ERR | UNC | IDNF | ABRT | TKONF | AMNF |
| VALID | | | VALID | | | VALID | | |

*FIG. 3B*

| DESCRIPTION | BYTES | FORMAT | TYPE |
|---|---|---|---|
| DATA STRUCTURE REV. NO. =0x0005 | 2 | BINARY | RD ONLY |
| 1st DRIVE ATTRIBUTE | 12 | | RD/WR |
| ○○○ | ○○○ | ○○○ | ○○○ |
| 30th DRIVE ATTRIBUTE | 12 | | RD/WR |
| OFF-LINE DATA COLLECTION STATUS | 1 | | RD ONLY |
| RESERVED | 1 | | |
| TOTAL TIME (SEC) TO COMPLETE NEXT SEGMENT | 2 | | RD ONLY |
| RESERVED | 1 | | |
| OFF-LINE DATA COLLECTION CAPABILITY | 1 | | RD ONLY |
| DRIVE FAILURE PREDICTION CAPABILITY | 2 | | |
| DRIVE ERROR LOGGING CAPABILITY | 1 | BINARY | RD ONLY |
| RESERVED (0x00) | 15 | | RD/WR |
| VENDOR UNIQUE | 125 | | RD ONLY |
| DATA STRUCTURE CHECKSUM | 1 | | RD ONLY |
| TOTAL BYTES | 512 | | |

FIG. 3C

| DESCRIPTION | BYTES | FORMAT | TYPE |
|---|---|---|---|
| ATTRIBUTE ID NUMBER | 1 | BINARY | RD ONLY |
| STATUS FLAG | 2 | BIT FLAGS | RD ONLY |
| BIT 0 | | | |
| BIT 1 | | | |
| BIT 2 | | | |
| BIT 3 | | | |
| ATTRIBUTE VALUE | 2 | BINARY | RD ONLY |
| VENDOR SPECIFIC | 8 | BINARY | RD ONLY |
| TOTAL BYTES | 12 | | |

FIG. 3D

| VALUE | DEFINITION |
|---|---|
| 00H | OFF-LINE DATA COLLECTION ACTIVITY WAS NEVER STARTED |
| 01H | RESERVED |
| 02H | OFF-LINE DATA COLLECTION ACTIVITY WAS COMPLETED WITHOUT ERROR |
| 03H | RESERVED |
| 04H | OFF-LINE DATA COLLECTION ACTIVITY WAS SUSPENDED BY AN INTERRUPTING COMMAND FROM POST |
| 05H | OFF-LINE DATA COLLECTION ACTIVITY WAS ABORTED BY AN INTERRUPTING COMMAND FROM HOST |
| 06H | OFF-LINE DATA COLLECTION ACTIVITY WAS ABORTED BY THE DEVICE WITH A FATAL ERROR |
| 07H-3FH | RESERVED |
| 40H-7FH | VENDOR SPECIFIC |
| 80H | OFF-LINE DATA COLLECTION ACTIVITY WAS NEVER STARTED. THE AUTO-OFF-LINE FEATURE IS ENABLED |
| 81H | RESERVED |
| 82H | OFF-LINE DATA COLLECTION ACTIVITY WAS COMPLETED WITHOUT ERROR. THE AUTO-OFF-LINE FEATURE IS ENABLED |
| 83H | RESERVED |
| 84H | OFF-LINE DATA COLLECTION ACTIVITY WAS SUSPENDED BY AN INTERRUPTING COMMAND FROM HOST. THE AUTO-OFF-LINE FEATURE IS ENABLED |
| 85H | OFF-LINE DATA COLLECTION ACTIVITY WAS ABORTED BY AN INTERRUPTING COMMAND FROM HOST. THE AUTO-OFF-LINE FEATURE IS ENABLED |
| 86H | OFF-LINE DATA COLLECTION ACTIVITY WAS ABORTED BY THE DEVICE WITH A FATAL ERROR. THE AUTO-OFF-LINE FEATURE IS ENABLED |
| 87H-BFH | RESERVED |
| C0H-FFH | VENDOR SPECIFIC |

*FIG. 3E*

| BIT | DEFINITION |
|---|---|
| 0 | OFF-LINE IMMEDIATE COMMAND<br>0=NOT SUPPORTED<br>1=SUPPORTED |
| 1 | ENABLE AUTOMATIC OFF-LINE<br>0=NOT SUPPORTED<br>1=SUPPORTED |
| 2 | ABORT OFF-LINE BY HOST<br>0=SUSPEND/RESUME<br>1=ABORT |
| 3 | OFF-LINE READ SCANNING WITH DEFECT REALLOCATION<br>0=NOT SUPPORTED<br>1=SUPPORTED |
| 4-7 | RESERVED |

*FIG. 4A*  400

| LOGGING SECTOR NUMBER | PURPOSE | R/W |
|---|---|---|
| 00h | RESERVED | TBD |
| 01h | SMART DRIVE ERROR LOGGING | RO |
| 02h-05h | RESERVED FOR SMART ERROR LOG EXTENSION | RO |
| 06h | RESERVED FOR DRIVE SELF-TEST | RO |
| 07h-7Fh | RESERVED | TBD |
| 80h-9Fh | HOST VENDOR SPECIFIC | R/W |
| A0h-BFh | DEVICE VENDOR SPECIFIC | VS |
| C0h-FFh | VENDOR SPECIFIC | VS |

KEY -
RO - SECTOR IS READ ONLY BY THE HOST
R/W - SECTOR IS READ OR WRITE BY THE HOST
TBD - SECTOR IS RESERVED AND READ/WRITE STATUS WILL BE ASSIGNED WHEN THE ADDRESS IS ASSIGNED
VS - SECTOR IS VENDOR SPECIFIC THUS READ/WRITE ABILITY IS VENDOR SPECIFIC

FIG. 4B

| | DESCRIPTION | BYTES | FORMAT | TYPE |
|---|---|---|---|---|
| 412 | S.M.A.R.T. DRIVE ERROR LOGGING VERSION=1 | 1 | DECIMAL | RD ONLY |
| 414 | ERROR LOG DATA STRUCTURE POINTER | 1 | DECIMAL | RD ONLY |
| 416 | 1st ERROR ATTRIBUTE | 90 | SEE TABLE 7 | |
| | ∘∘∘ | ∘∘∘ | ∘∘∘ | ∘∘∘ |
| | 5th ERROR ATTRIBUTE | 90 | SEE TABLE 7 | |
| 417 | ATA DEVICE ERROR COUNT (MANDATORY) | 2 | BINARY | RD ONLY |
| | RESERVED | 57 | | |
| 420 | DATA STRUCTURE CHECKSUM | 1 | BINARY | RD ONLY |
| | TOTAL BYTES | 512 | | |

FIG. 4C

| | DESCRIPTION | BYTES | FORMAT | TYPE |
|---|---|---|---|---|
| 418 | 1st COMMAND DATA STRUCTURE | 12 | SEE TABLE 4 | |
| | ∘∘∘ | ∘∘∘ | ∘∘∘ | ∘∘∘ |
| | 5th COMMAND DATA STRUCTURE | 12 | SEE TABLE 4 | |
| 420 | ERROR DATA STRUCTURE | 30 | SEE TABLE 6 | |
| | TOTAL BYTES | 90 | | |

FIG. 4D

| | DESCRIPTION | BYTES | FORMAT | TYPE |
|---|---|---|---|---|
| | WRITE REGISTER | | | |
| 422 | DEVICE CONTROL REGISTER | 1 | BINARY | RD ONLY |
| 302 | FEATURES REGISTER | 1 | BINARY | RD ONLY |
| 304 | SECTOR COUNT | 1 | BINARY | RD ONLY |
| 306 | SECTOR NUMBER | 1 | BINARY | RD ONLY |
| 308 | CYLINDER LOW | 1 | BINARY | RD ONLY |
| 310 | CYLINDER HIGH | 1 | BINARY | RD ONLY |
| 312 | DRIVE/HEAD | 1 | BINARY | RD ONLY |
| 314 | COMMAND REGISTER | 1 | BINARY | RD ONLY |
| 424 | COMMAND TIMESTAMP (MILLISECONDS FROM POWER-ON) | 4 | BINARY | RD ONLY |
| | TOTAL BYTES | 12 | | |

FIG. 4E

| DESCRIPTION | BYTES | FORMAT | TYPE |
|---|---|---|---|
| READ REGISTER | | | |
| RESERVED | 1 | BINARY | RD ONLY |
| ERROR REGISTER | 1 | BINARY | RD ONLY |
| SECTOR COUNT | 1 | BINARY | RD ONLY |
| SECTOR NUMBER | 1 | BINARY | RD ONLY |
| CYLINDER LOW | 1 | BINARY | RD ONLY |
| CYLINDER HIGH | 1 | BINARY | RD ONLY |
| DRIVE/HEAD | 1 | BINARY | RD ONLY |
| STATUS REGISTER | 1 | BINARY | RD ONLY |
| EXTENDED ERROR DATA | 19 | BINARY | RD ONLY |
| STATE | 1 | SEE TABLE 5 | |
| LIFE TIMESTAMP (LIFE OF THE DRIVE IN HOURS) | 2 | BINARY | RD ONLY |
| TOTAL BYTES | 30 | | |

FIG. 4F

| BITS 3-0 | DEFINITION |
|---|---|
| 0 | UNKNOWN |
| 1 | SLEEP |
| 2 | STANDBY |
| 3 | ACTIVE/IDLE |
| 4 | S.M.A.R.T. OFF-LINE OR SELF-TEST |
| 5-10 | RESERVED |
| 11-15 | VENDOR SPECIFIC |
| BITS 7-4 | DEFINITION |
| 0-15 | VENDOR SPECIFIC |

DRIVE ERROR LOGGING

CROSS-REFERENCE TO RELATED APPLICATIONS

This application is related to U.S. patent application Ser. No. 09/259,583, entitled "Background Read Scanning with Defect Reallocation", filed concurrently herewith and hereby incorporated by reference herein.

This application is related to U.S. patent application Ser. No. 09/258,858, entitled "Self Testing Disk Drive", filed concurrently herewith and hereby incorporated by reference herein.

This application is related to U.S. patent application Ser. No. 09/076,300, entitled "Method for Performing DFP Operations", filed May 11, 1998, which is a continuation of U.S. Pat. No. 5,761,411, which is a continuation-in-part of U.S. patent application Ser. No. 08/404,812 filed Mar. 13, 1995 entitled "Drive Failure Prediction Techniques for ATA Disk Drives", now abandoned, all of which are hereby incorporated by reference herein.

This application is related to U.S. Pat. No. 5,828,583, which is a continuation of U.S. patent application Ser. No. 08/404,812 filed Mar. 13, 1995 entitled "Drive Failure Prediction Techniques for ATA Disk Drives", now abandoned, all of which are hereby incorporated by reference herein.

BACKGROUND OF THE INVENTION

1. Field of the Invention

The present invention relates generally to disk fault correction techniques for storage devices and, more particularly, to a method of logging commands and error condition codes associated with drive errors.

2. Description of Related Art

The vast majority of personal computer (PC) systems available today come equipped with a peripheral data storage device such as a hard disk (HD) drive. Hard disks are comprised of rigid platters, made of aluminum alloy or a mixture of glass and ceramic, covered with a magnetic coating. Platters vary in size and hard disk drives generally come in two form factors, 5.25 in or 3.5 in. Typically, two or more platters are stacked on top of each other with a common spindle that turns the whole assembly at several thousand revolutions per minute. There is a gap between the platters, making room for a magnetic read/write head, mounted on the end of an actuator arm. There is a read/write head for each side of each platter, mounted on arms which can move them radially. The arms are moved in unison by a head actuator, which contains a voice coil—an electromagnetic coil that can move a magnet very rapidly.

Each platter is double-sided and divided into tracks. Tracks are concentric circles around the central spindle. Tracks physically above each other on the platters are grouped together into a cylinder. Cylinders are further divided into sectors. Depending on the disk drive vendor, a sector is typically comprised of 512 bytes of user data, followed by a number or number of cross-check bytes, a number of error correction code (ECC) bytes and other vendor specific diagnostic information. Thus, these devices are complex electro-mechanical devices and, as such, can suffer performance degradation or failure due to a single event or a combination of events.

There are generally two general classes of failures that can occur in disk drives. The first class is the hard or catastrophic type of failure which causes the drive to quickly and unpredictably fail. These failures can be caused by static electricity, handling damage, or thermal-related solder problems. The second class of failures result from the the gradual decay of other electrical and/or mechanical components within the drive after it is put in service.

Drive failure prediction techniques for this second class of failures are discussed in U.S. Pat. No. 5,828,583 to Bush et al. and U.S. Pat. No. 5,761,411 to Teague et al.

With respect to the first class of failures, the nature of these failures causes them to be very difficult to predict. However, even if prediction is impractical there is still a need to understand the root cause of the hard failure to determine if there is a design or manufacturing defect present in the drives.

Typically, the determination of a hard failure is performed in a lab of the manufacturer after the defective drive has been returned. If the drive is at all operable, certain tests can be performed on the drive to exercise a wide array of operations in an attempt to recreate the failure. Laboratory equipment, such as an ATA bus analyzer, is used to capture information pertaining to the operations and the sequence of operations in order to have a history of information for diagnosing the failure. If the failure can be recreated, the root cause of the problem can be understood.

However, the hard failures are very difficult to recreate. Certain hard failures render the drive fully inoperable. Other hard failures may render the platter or media inoperable while the electronics still function. Still other failures may never be recreated because of certain environmental conditions that are not known.

Therefore, there is a need for an improved means for diagnosing hard failures in disk drives.

SUMMARY OF THE INVENTION

According to a preferred embodiment, the present invention includes a method, apparatus and computer system for logging errors of a storage device. The storage device is capable of executing commands received from a host processor and detecting errors in the performance of those commands. The storage device also includes a non-volatile memory or media for storing data and other information as described herein. As commands are received by the storage device a list of previously executed commands is maintained by the storage device. When an error is detected by the storage device, a set of error conditions, such as the ATA task file read registers are stored in the non-volatile memory along with the command list to create an error log. The error log is a useful source of diagnostic information for errors that are difficult to replicate on the storage device.

The storage device is responsive to a retrieve error log command for providing the error logs to a host computer when the command is received. A predetermined number of error logs are maintained by the storage device in a circular buffer with a pointer providing an indication as to which error log is most recent. Additionally, each command has associated with it a time stamp indicating the time when the command was received by the storage device and each error has a time stamp associated with it indicating when the error was detected by the storage device. Additionally, since the storage device is capable of operating in a number of states, such as SLEEP, STAND-BY, ACTIVE/IDLE, and OPERATING state at the time of the error is also stored in each error log. Additionally, the storage device maintains a running count of the number of errors detected.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
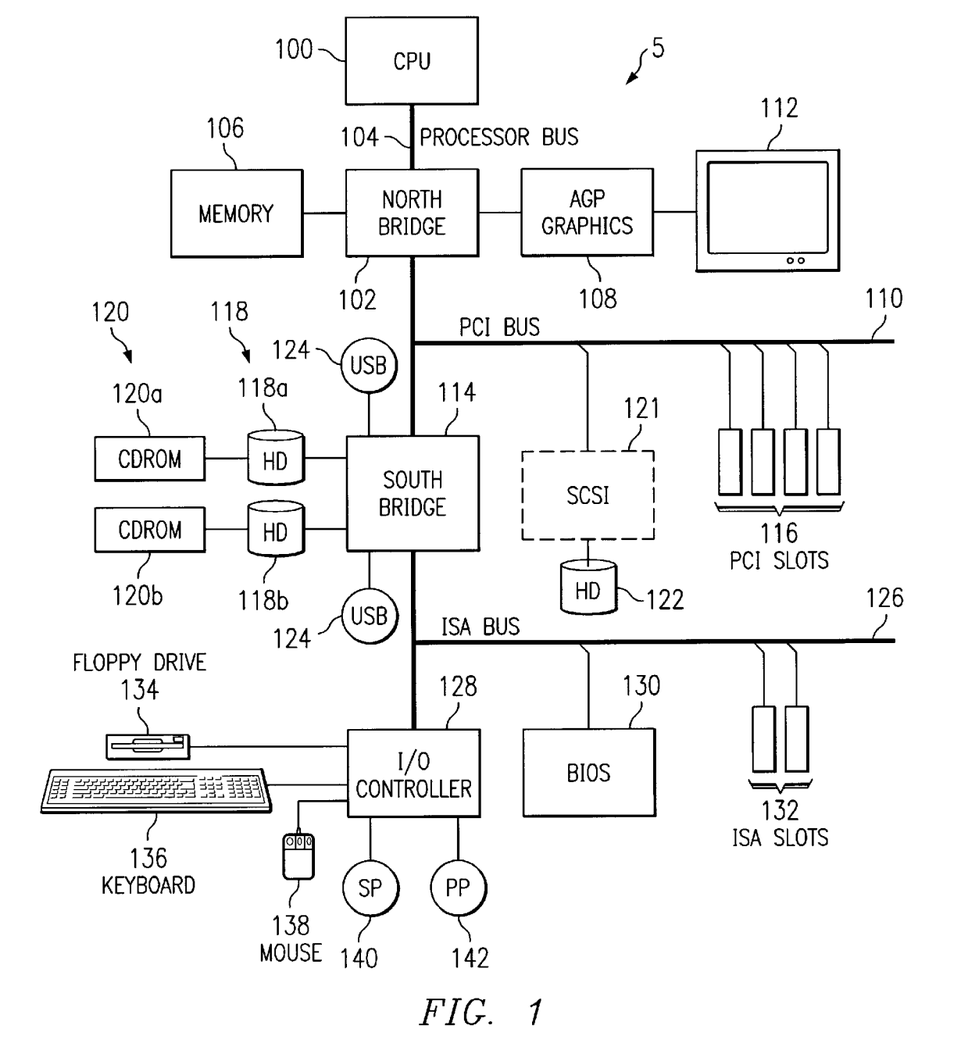
FIG. 1 is a block diagram of a computer system according to a preferred embodiment.

Referring first to FIG. 1, there is illustrated a computer system S, for example a personal computer (or "PC"). While the computer system S shown is of an International Business Machines (IBM) PC variety, the principles of the present invention are equally applicable to other computer platforms or architectures, such as those associated with by IBM, Apple, Sun and Hewlett Packard. While the following description is limited to typical components of an IBM-PC platform, it is understood that corresponding components from alternative platforms could be used. For example, in an IBM-PC an Intel processor is typical whereas in an Apple computer a Power-PC processor is typical. The invention is also applicable to other devices employing disk drives, such as printers, voice-mail systems and other specialized electronic devices.

As is conventional in the art, the computer system S includes a central processing unit (CPU) or, simply, processor 100, such as an Intel Pentium II microprocessor or the like. It is understood that alternative processors from Intel, AMD, Cyrix and others may be used. A multiprocessor architecture is also compatible with the present invention. The processor 100 is coupled to a north bridge 102 by a host or processor bus 104. The north bridge 102 includes a memory controller for coupling to an array of memory 106, an Accelerated Graphics Port (AGP) interface for coupling to an AGP graphics controller 108, and a Peripheral Component Interconnect (PCI) interface for providing a PCI bus 110. The AGP graphics controller 108 is further connectable to a monitor or display 112.

In the computer system S, the PCI bus 110 couples the north bridge 102 to a south bridge 114 and a number of PCI slots 116 for receiving expansion cards, such as a network interface controller (not shown) or a Small Computer System Interface (SCSI) controller 121.

The south bridge 114 is a integrated multifunctional component that includes a number of functions. For example, an enhanced direct memory access (DMA) controller, interrupt controller, timer, integrated drive electronics (IDE) interface, a universal serial bus (USB) host controller and an industry standard architecture (ISA) bus controller for providing an ISA bus 126. The IDE interface is a two channel interface supporting up to four IDE devices, such as a hard disk drive 118 (specifically 118a and 118b) and a compact disk read only memory CD-ROM 120 (specifically 120a and 120b). As an alternative to IDE hard drives, a SCSI controller 121 could be attached directly to the PCI bus 110 for coupling one or more SCSI hard drives 122 to the computer system S. The SCSI devices 122 can be mounted in the computer system S enclosure or be provided externally. The south bridge 114 USB host controller is connected to a pair of USB connectors 124 for communicating with USB devices.

In the computer system S, the ISA bus 126 couples the south bridge 114 to a multifunction input/output (I/O) controller 128, a basic input/output system (BIOS) ROM, and a number of ISA slots 132 for receiving expansion cards. The multifunction I/O controller 128 includes a number of functions, such as a floppy disk drive controller for connecting to a floppy disk drive 134; a keyboard controller for connecting to a keyboard 136 and a mouse 138; a serial communications controller for providing at least one serial port 140; and a parallel port interface for providing at least one parallel port 142.

Figure 2:
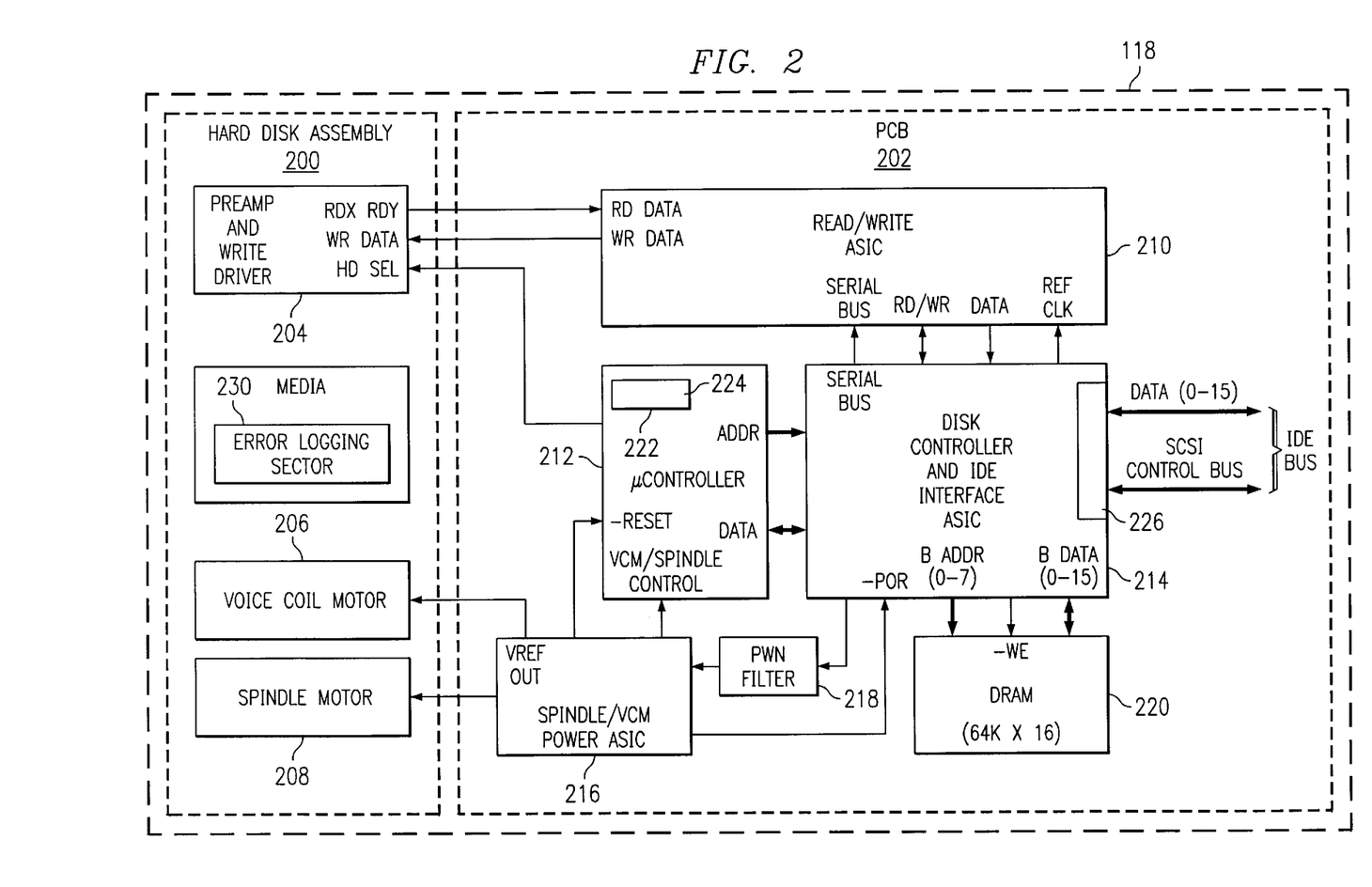
FIG. 2 is a block diagram of a storage device according to a preferred embodiment.

Referring now to FIG. 2, there is illustrated a block diagram of the hard disk drive 118. It is understood that while a typical IDE disk drive is illustrated and discussed here, the principles disclosed herein can apply equally to SCSI and other types of storage devices, such as CD-ROM and Digital Versatile Disk (DVD), especially writable CD-ROM and DVD drives. Additionally, it is understood that the many different versions of SCSI, IDE or ATA do not limit the present invention.

The hard disk drive 118 includes a head/disk assembly 200 and a printed circuit board (PCB) assembly 202. The head/disk assembly 200 includes a number of mechanical subassemblies which are sealed under a metal cover and not illustrated here such as, a spindle motor assembly, a disk stack assembly, a headstack assembly, a rotary positioner assembly, an automatic actuator lock and an air filter. The headstack assembly consists of read/write heads electrically coupled to a read preamplifier and write driver circuit 204. The rotary positioner assembly includes a voice coil motor (VCM) 206 for positioning the read/write heads. The spindle motor assembly includes a spindle motor 208.

The PCB assembly 202 includes a read/write controller 210, a microcontroller 212, a disk controller and IDE interface 214, a spindle/VCM power driver 216, a pulse width modulator (PWM) filter 218 and a memory 220. Memory 220 preferably comprises dynamic random access memory (DRAM) but other memories such as static RAM, erasable programmable read only memory (EPROM), electrically erasable ROM or even a magnetic memory (e.g., hard drive) could be used.

The read/write controller 210 provides write data precompensation and read channel processing functions for the drive 118.

The microcontroller 212 provides local processor services to the drive electronics under program control. The microcontroller 212 manages the resources of the disk controller and IDE interface 214, the read/write controller 210, and the spindle/VCM power driver 216. The microcontroller 212 includes an internal memory 222 (e.g., ROM) providing program code that the microcontroller 212 executes to complete a drive spinup and recalibration procedure, after which the microcontroller 212 reads additional control code from the disk and stores it in the memory 220. Alternatively, the memory 222 could be external from the microcontroller 212 and could contain the additional control code. As a further alternative, the program code and control code could be downloaded by the processor 100 into memory 220. Hereinafter, the collective control code and program code will be referred to as code 224.

The disk controller and IDE interface 214 provides control functions to the drive 118 under the direction of the microcontroller 212. The disk controller and IDE interface 214 includes an analog-to-digital (A/D) converter, an error correction and detection controller, a sequencer, a buffer controller, a microcontroller interface, a servo controller including PWM, a serial interface and an IDE interface controller 226. The IDE interface controller 226 provides data handling, bus control, and transfer management services for the bus connecting the hard disk drive 118 to the south bridge 114, which is known as the IDE bus or ATA bus. The processor 100 writes to registers contained in the IDE interface controller 226 when transmitting commands to the drive 118 and reads from the registers to retrieve status. Data may be transmitted through the programmed I/O registers or through DMA mechanisms. The IDE interface 226 preferably conforms to one or more of the following ATA specifications hereby incorporated by reference herein:

1. ATA-1: AT Attachment Interface for Disk Drives, document ANSI X3.221-1994;
2. ATA-2: AT Attachment Interface with Extensions, document ANSI X3.279-1996;
3. ATA-3: the AT Attachment-3 Interface, document ANSI X3.298-1997; and
4. ATA-4: the AT Attachment-4 Interface, document ANSI X3.xxx-1998.

The error correction and detection controller preferably utilizes a Reed-Solomon encoder/decoder scheme that is used for disk read/write operations to correct multiple bit errors per sector, but the present invention is not limited to a particular type of error correction code (ECC).

The spindle/VCM power driver 216 provides control signals to the VCM 206 and spindle motor 208. The PWM filter 218 receives a PWM signal from the disk controller and IDE interface 214 to output to the spindle/VCM power driver 216 to control the motion of the read/write heads.

Figure 3A:
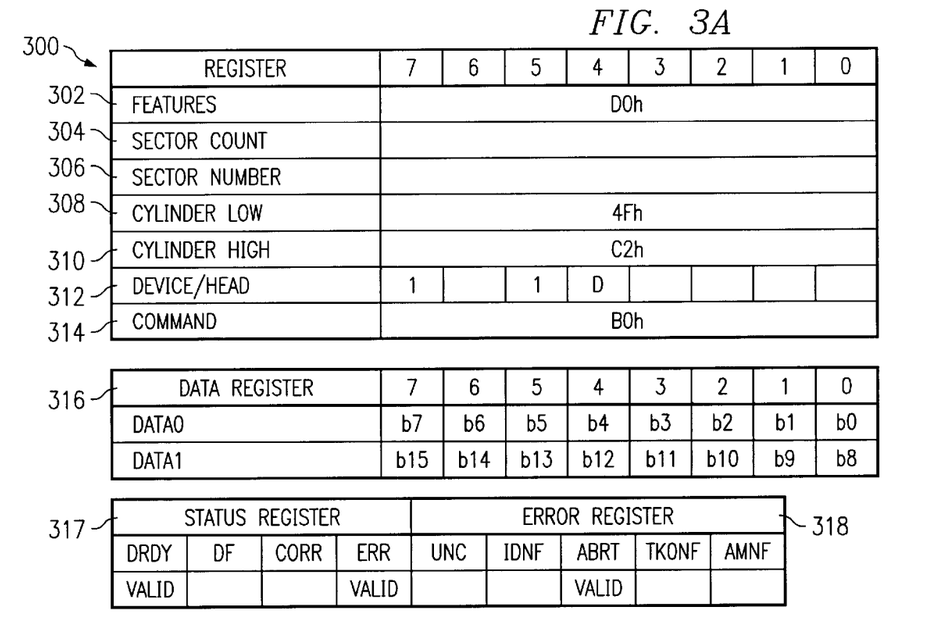
FIG. 3A is a table illustrating a command block according to a preferred embodiment of the storage device.
Figure 3B:
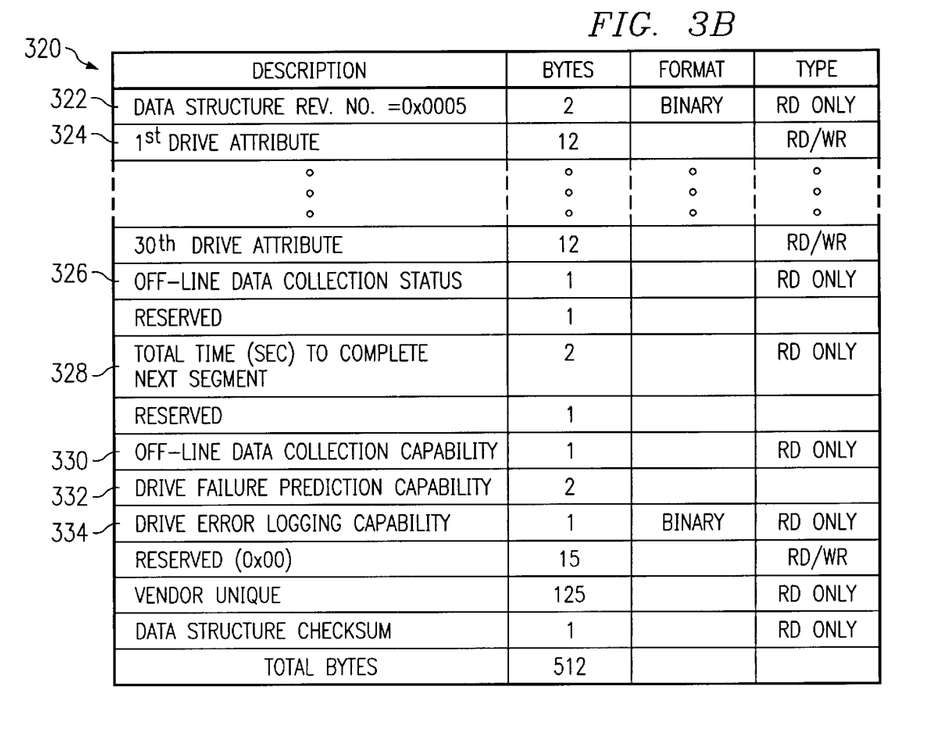
FIG. 3B is a table illustrating a data structure according to a preferred embodiment.
Figure 3C:
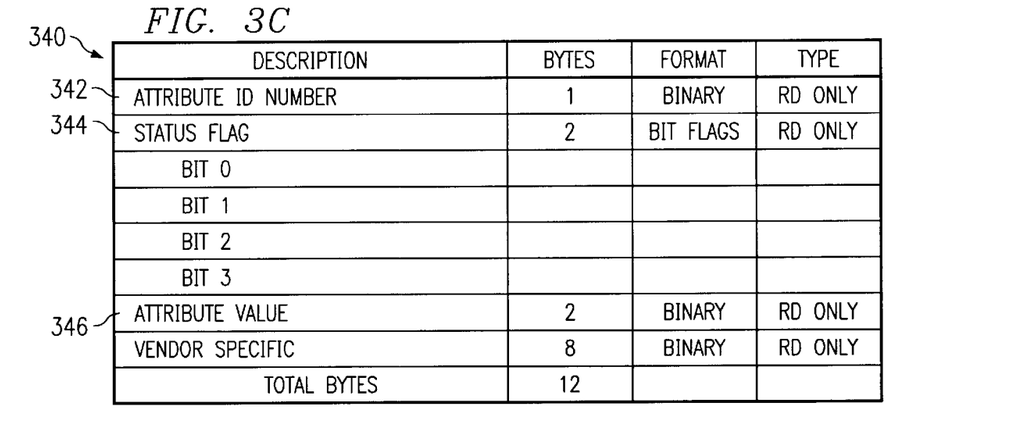
FIG. 3C is a table illustrating an attribute data structure of the drive attribute of FIG. 3B. according to a preferred embodiment.

Referring now to FIGS. 3A–C, there are illustrated a SMART subcommand to control and monitor various aspects of the present invention. One skilled in the art of IDE or ATA hard drives will understand that SMART subcommands are accessed through a SMART command B0h of the ATA command set, as defined in the various ATA specifications identified above. Recall that ATA commands are issued by the processor 100 to the IDE interface controller 226, and in particular, a command block 300 of the IDE interface controller. The command block registers 300 are used for sending commands to the drive 118 or posting status from the drive 118.

As illustrated in FIG. 3A, these registers include the features 302, sector count 304, sector number 306, cylinder low 308, cylinder high 310, device/head 312, command 314, data registers 316, status register 317 and error register 318. While it is understood that SCSI devices have different commands, data structures and protocols which will result in a slightly different implementation, the principles of the present invention are easily practiced on SCSI devices by one of ordinary skill in the art.

Prior to writing any SMART command to the IDE interface controller 226, key values are written by the processor 100 into the cylinder low 308 and cylinder high 310 registers.

The SMART subcommands use a single command code (B0h) and are differentiated from one another by the value placed in a features register 302. In order to issue a command, the processor 100 will write the subcommand-specific code to the drive's features register 302 before writing the command code to the command register 314. The subcommands and a full description of their operation are contained in the SMART and ATA specifications and need not be repeated here.

Of particular interest to the present invention is the SMART subcommand entitled "Read Data Attribute Values," or sometimes just "SMART Read Data," which is preferably accessed by writing $D_0h$ in the features register (as shown in FIG. 3A). "Attributes" are the specific performance or calibration parameters that are used in analyzing the status of the drive 118. Attributes are selected based on that parameters' ability to contribute to the prediction of degrading or fault conditions for the drive 118. "Attribute values" are used to represent the relative reliability of individual performance or calibration attributes. Examples of monitorable attributes include, head-to-disk flying height, data throughput performance, spin-up time, re-allocated sector count, seek time performance, spin try recount, drive calibration retry count, ECC circuitry, error rates, and temperature. This subcommand causes the drive 118 to return the drive's device attribute values to the processor 100 or requestor.

Figure 3D:
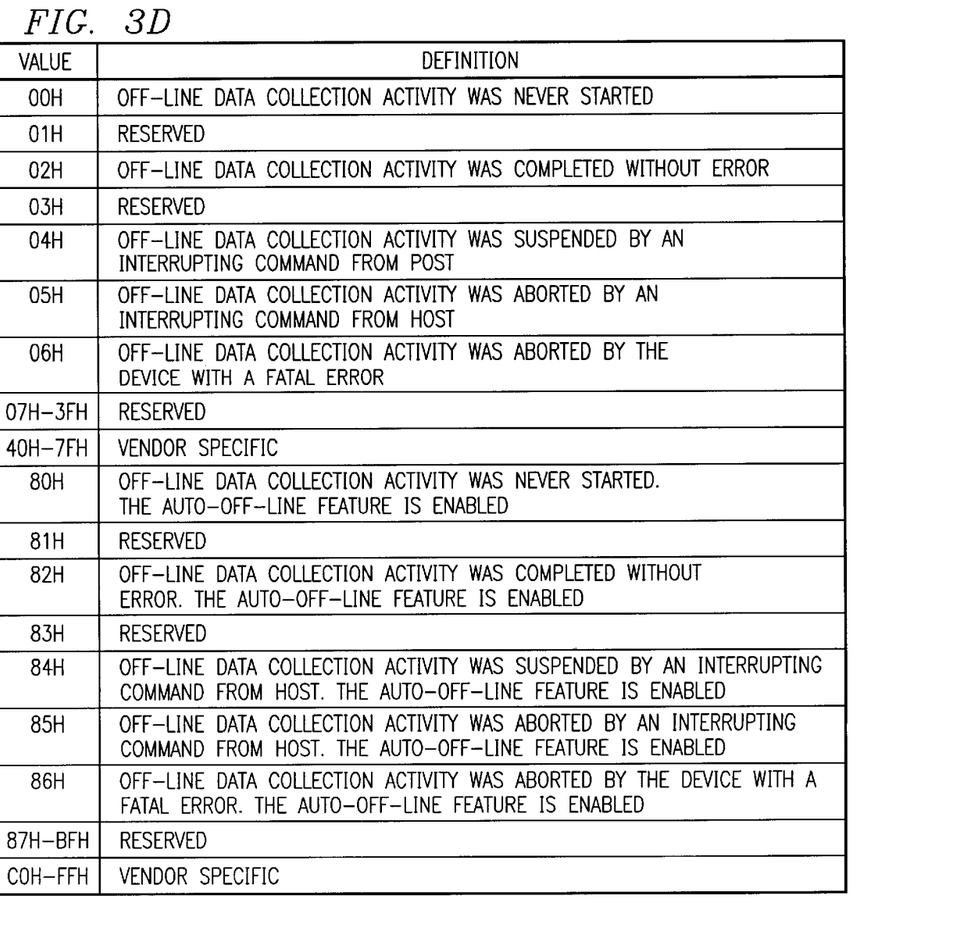
FIG. 3D is a table illustrating status values for an off-line data collection status register according to a preferred embodiment.

The device attribute data structure 320 returned is illustrated in FIG. 3B. A "Data Structure Revision Number" 322 identifies which version of this data structure is implemented by a particular drive 118. The "Data Structure Revision Number" for the present invention shall preferably be set to 0005h. Up to thirty different "Drive Attributes" 324 can be reported, each "Drive Attribute" 324 having a twelve byte data structure 340 shown in FIG. 3C that makes up the information for each individual attribute entry. The drive attribute data structure 340 of a "Drive Attribute" 324 is illustrated in greater detail in FIG. 3C and discussed below. Possible values for an "Off-line Data Collection Status" 326 are illustrated in FIG. 3D. Rather than scan the entire disk drive 118 in one operation, it is preferable to separate the operation into a number of smaller operations called segments. A "Total Time to Complete Next Segment" field 328 is a field preferably for holding a two byte value representing an average time in seconds to complete a segment or section of the scan. The average time is calculated and updated by the microcontroller 212 periodically, such as after every segment is scanned. An "Off-Line Data Collection Capability" indicator 330 is a one byte field further described below. A "Drive Failure Prediction Capability," sometimes called "SMART Capability," indicator 332 is defined in the SMART specification and is not repeated herein.

A "Drive Error Logging Capability" indicator 334 is a one byte field indicating whether SMART Driver Error Logging is supported. If the value of bit 0 equals one, then a SMART Driver Error Logging is implemented by the drive 118. If the value of bit 0 equals zero, then error logging is not implemented. The definitions and descriptions of the remaining bytes of the device attribute data structure 320 which are not specifically mentioned herein are found in the SMART specification.

The data structure 340 of a drive attribute 324 is illustrated in FIG. 3C. An attribute identification (ID) number field 342 identifies which attribute number is held by the drive attribute 324. According to the preferred embodiment, there are four attributes consisting of attribute identification (ID) numbers 1, 5, 197 and 198 which are contained in an attribute ID number register 342. The attribute ID numbers are not necessarily related to the attribute numbers of the drive attribute register 324, i.e., ID number 5 could be held as the $2^{nd}$ drive attribute 324.

Attribute ID number 1 preferably corresponds to a "Raw Read Error Rate" measurement. The raw read error rate is preferably a normalized measurement value indicative of the frequency of read error occurences.

Attribute ID number 5 preferably corresponds to a "Re-Allocated Sector Count" measurement. The re-allocated sector count is preferably a count value indicative of the number of re-allocated or bad sectors.

Attribute ID number 197 preferably corresponds to a "Current Pending Sector Count" measurement. Current Pending Sector Count holds a count of the total number of sectors in the drive's "pending" list. The pending list is a typical list kept by the drive 118 to flag a potentially bad sector that needs to be validated on the next write operation and either reallocated and added to a "defective list" (sometimes called "G-list") or determined to be acceptable and removed from the pending list.

Attribute ID number 198 preferably corresponds to a "Off-Line Scan Uncorrectable Sector Count" measurement. Off-line Scan Uncorrectable Sector Count indicates the number of new sectors that have been detected to have uncorrectable read errors during the last read scan. At the beginning of each read operation the drive 118 resets the count to zero and accumulates in this attribute the number of new uncorrectable errors during the entire read scan operation.

The status flag 344 may include a pre-failure warranty bit, an on-line collection bit, a performance bit, an error rate attribute type bit, an event count attribute type bit and a self-preserving attribute type bit.

The attribute value 346 includes raw attribute values which may be useful to the host, such as the number of power-on hours.

Figure 3E:
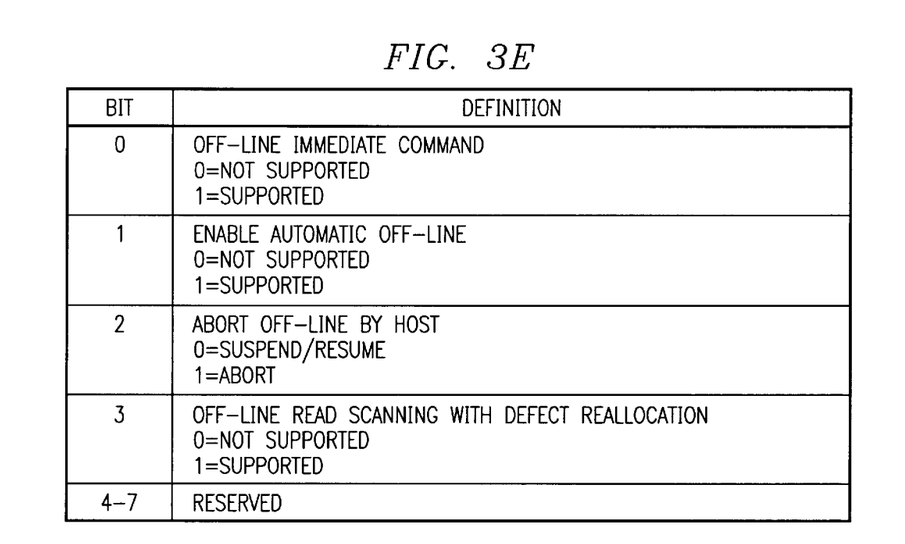
FIG. 3E is a table illustrating possible values of an off-line data collection capability field of FIG. 3B, according to the preferred embodiment.

Referring now to FIG. 3E, there is illustrated a bit-mapped field corresponding to the "Off-Line Data Collection Capability" indicator 330. If the value of bit 0 equals one, then a SMART Execute Off-Line Immediate subcommand is implemented by the drive 118. If the value of bit 0 equals zero, then the subcommand is not implemented. If the value of bit 1 equals one, then a SMART Enable Disable Automatic Off-Line subcommand is implemented by the drive 118. If the value of bit 0 equals zero, then the subcommand is not implemented. If the value of bit 1 equals one, then the drive 118 aborts all off-line data collection activity initiated by a SMART Execute Off-Line Immediate command upon receipt of a new command. Off-line data collection activity must be restarted by a new SMART Execute Off-Line Immediate subcommand from the host. If the value of bit 0 equals zero, then the drive 118 suspends off-line data collection activity after some predetermined event. The reader is referred to the SMART specification for more details on these subcommands. If the value of bit 3 equals one, then a SMART Off-Line Read Scanning With Defect Reallocation subcommand is implemented by the drive 118. If the value of bit 0 equals zero, then the subcommand is not implemented.

Of additional interest to the present invention is the SMART subcommand entitled "Execute Off-Line Immediate," which is executable by writing D4h in the features register shown in FIG. 3A. In response to an "Execute Off-Line Immediate" command, the drive 118 completes an entire off-line read scan. This feature is particularly useful during diagnostics test of the drive 118.

Of additional interest to the present invention is the SMART subcommand entitled "Enable/Disable Automatic Off-Line Data Collection," which is executable by writing DBh in the features register shown in FIG. 3A.

Figure 4A:
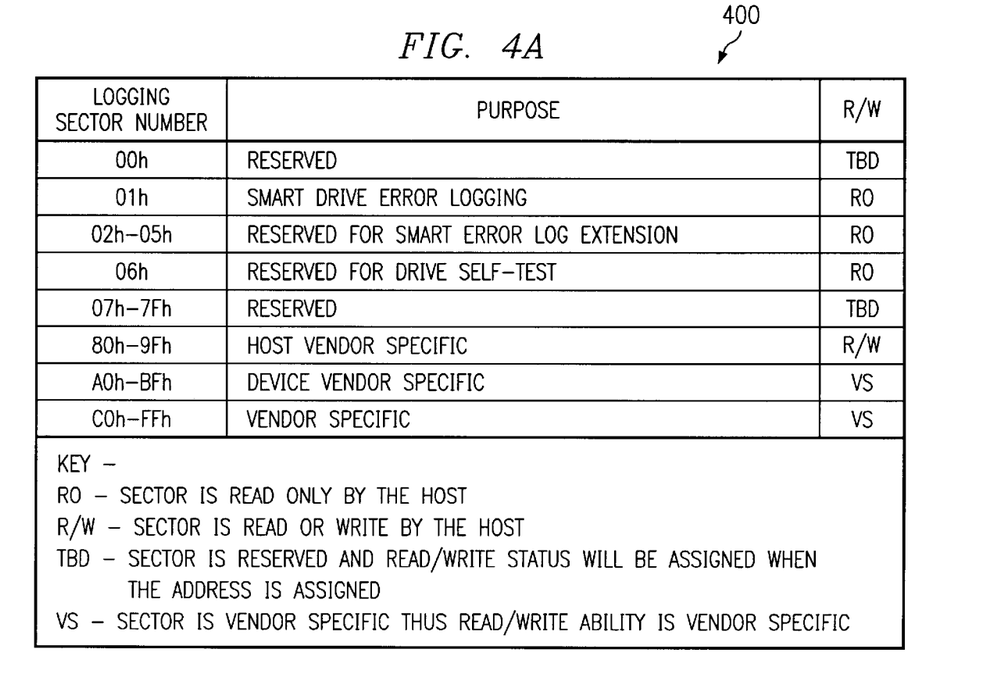
FIG. 4A is a table illustrating logging sectors of the storage device, according to the preferred embodiment.

Of additional interest to the present invention is a command entitled "Retrieve SMART Drive Error Log," which is preferably accessible by setting the command register 314 to B0h, features register 302 to D5h, the cylinder low register 308 to 4Fh, the cylinder high register 310 to C2h, the sector number register 306 to 01h and setting the sector count register 304 to an appropriate logging sector number 400. The logging sector number 400 is illustrated in greater detail in FIG. 4A and discussed below.

According to the preferred embodiment, an error log is created and maintained by the microcontroller 212 in memory 220. The error log comprises a predetermined number of commands executed prior to an error as well as the command that caused the error. Once an error is detected, the microcontroller 212 writes the error log to a non-volatile memory, such as the logging sector 400 or alternatively an EEPROM, Flash ROM, or battery backed static RAM, and preferably keeps an extra copy for fault tolerance. A count of the number of errors is also kept.

For purposes of the error log, an error includes most errors trackable by the drive 118 including ATA errors (error bit "ERR" in the status register 317 set to one), uncorrectable data errors (UNC), requested ID not found (IDNF) errors, servo errors, write fault errors, read errors and hardware and software resets.

Figure 4B:
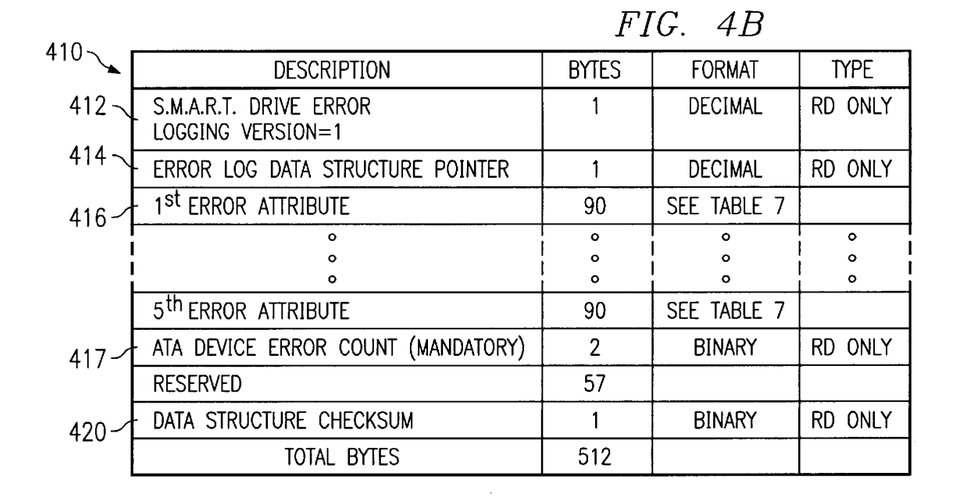
FIG. 4B is a table illustrating an error logging sector data structure of the storage device, according to the preferred embodiment.

The retrieve SMART drive error log subcommand causes the drive 118 to return an error logging sector data structure 410, such as the one illustrated in FIG. 4B, to the processor 100 or requestor. Contained in the error logging sector data structure 410 is a drive error logging version number 412 (set to one), a error log data structure pointer 414, a predetermined number of error log data structures 416, an ATA device error count 418 and a data structure checksum 420.

The error log data structure pointer 414 points to the most recent error log data structure 416 contained in the error log data structure 410. The error log data structure 416 entries are viewed as a circular buffer with a predetermined number of entries, such as five. An error log data structure pointer 414 value of zero indicates there are no valid error log data structures 416. Values of 1–5 are valid and values over 5 are reserved and invalid (if only five entries are desired). More specifically, the first error is logged into the first error log data structure 416; the second error is logged into the second error log data structure 416, etc. If five entries are kept, the sixth error replaces the first error logged. Unused error log data structures 416 are initialized to zero.

The ATA device error count indicator 417 is a two byte field for containing and maintaining a count of the absolute number of errors detected by the drive 118.

Figure 4C:
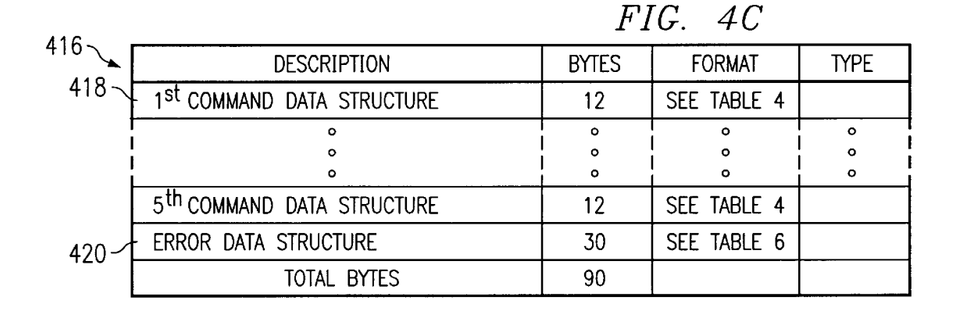
FIG. 4C is a table illustrating an error log data structure of FIG. 4B, according to the preferred embodiment.

Referring now to FIG. 4C, there is illustrated the error log data structure 416 comprising a predetermined number of command data structures 418 and an error data structure 420.

Figure 4D:
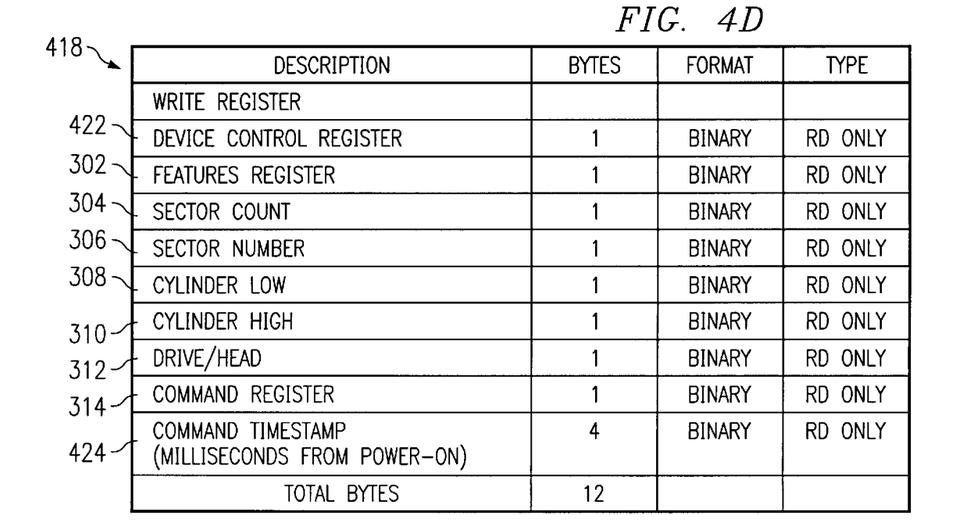
FIG. 4D is a table illustrating a command data structure of FIG. 4B, according to the preferred embodiment.

Referring now to FIG. 4D, there is illustrated in greater detail the command data structure 418. The command data structure 418 preferably includes values from the features register 302, sector count register 304, sector number register 306, cylinder low register 308, cylinder high register 310, device/head register 312 and the command register 314 taken at the time the command was executed. A device control register 422 is set to FFh if a hardware reset occurs, thereby providing an indication distinguishable from a soft reset. A command timestamp field 424 is reflective of the time in milliseconds from power on that the command was executed. The field is reset to zero after every power cycle.

Figure 4E:
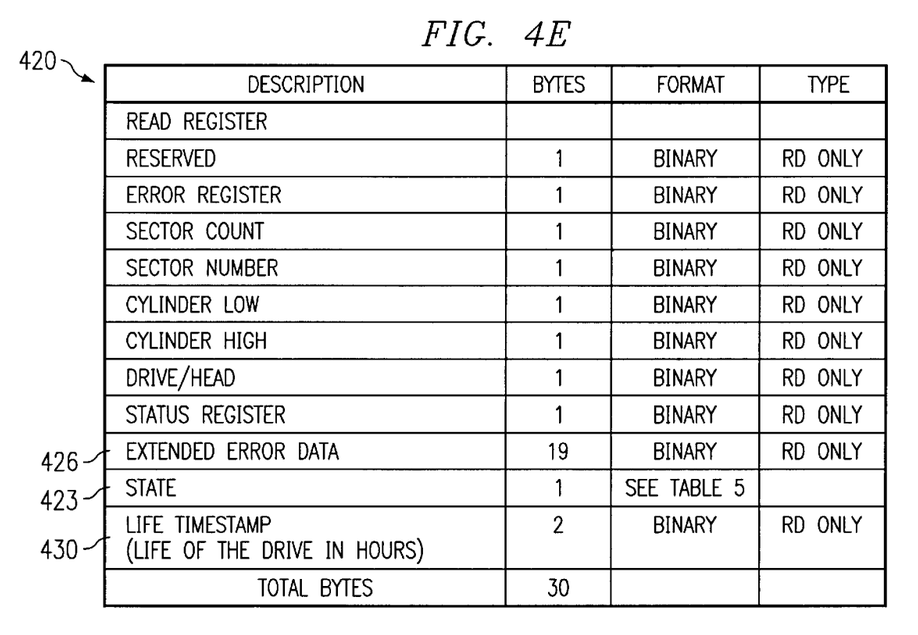
FIG. 4E is a table illustrating an error data structure of FIG. 4C, according to the preferred embodiment.
Figure 4F:
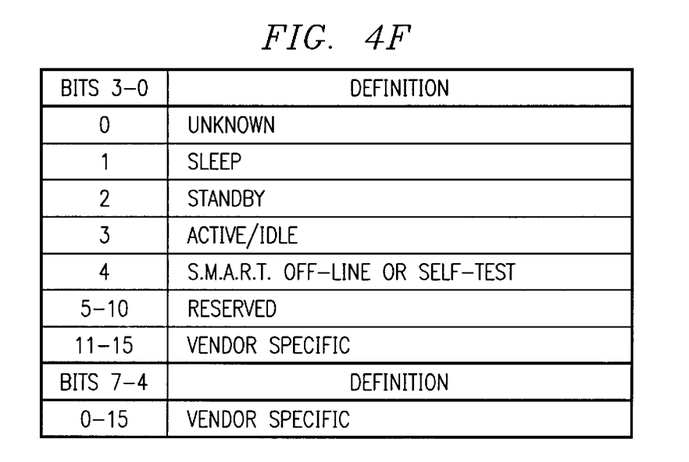
FIG. 4F is a table illustrating operating state codes of the storage device, according to the preferred embodiment.

Referring now to FIG. 4E, there is illustrated in greater detail the error data structure 420. The error data structure 420 preferably includes values from the error register 318, sector count register 304, sector number register 306, cylinder low register 308, cylinder high register 310, device/head register 312 and the status register 317. An extended error data field 426 preferably includes multiple bytes of predetermined error condition code. A state field 428 is preferably a bit map field for holding a value indicative of an operating state of the drive 118 at the time an error occurs. The preferred bit definitions for the state field 428 are illustrated in FIG. 4F. A life timestamp field 430 is reflective of the number of hours after power-on the error occurred, as indicated by a SMART power-on hours timer (not shown).

Figure 5A:
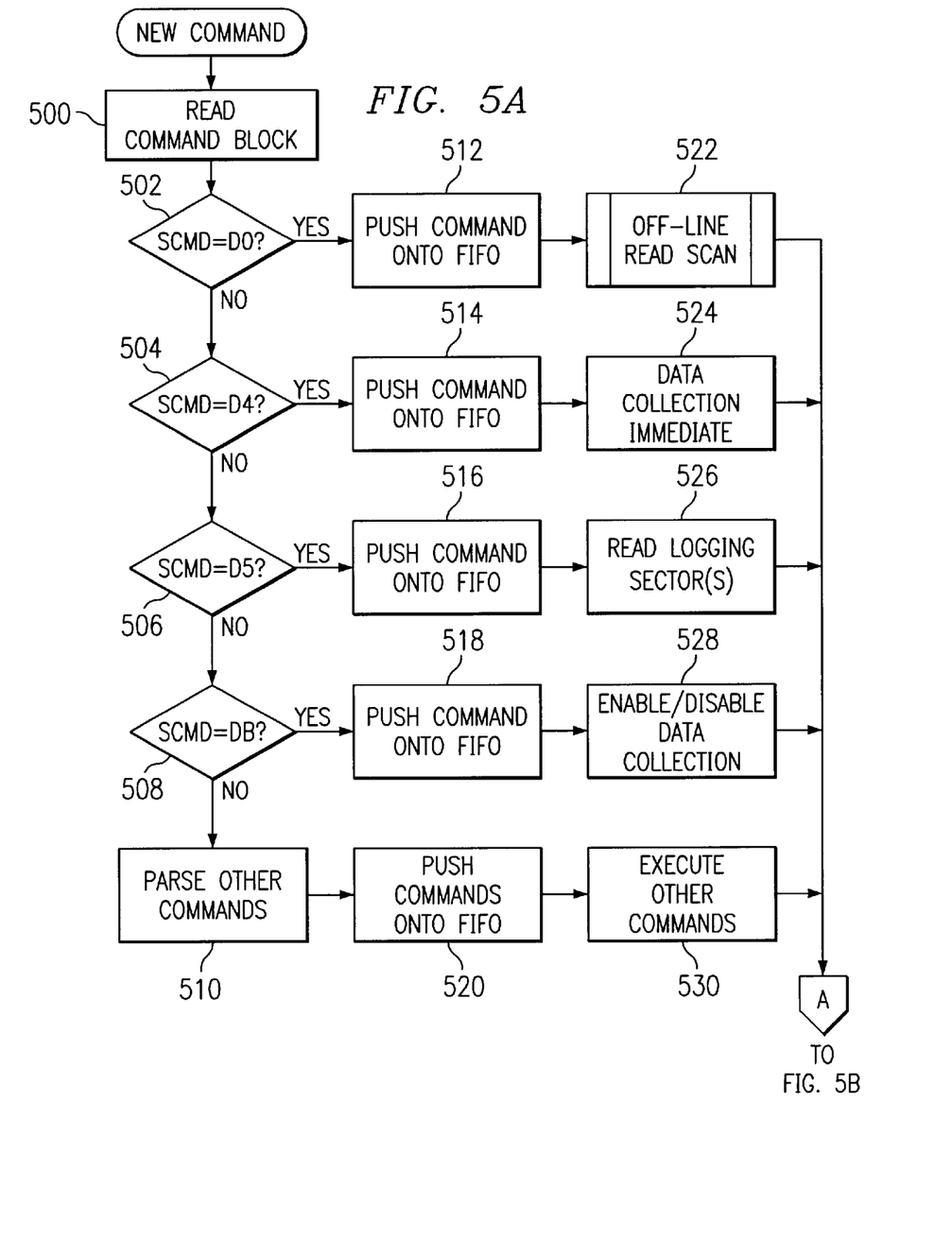
FIGS. 5A–B are flow charts illustrating a method for processing and developing an error log, according to a preferred embodiment.
Figure 5B:
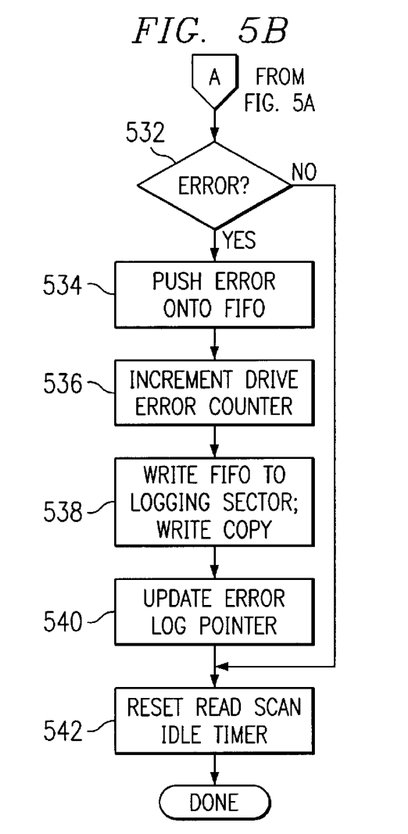

Referring now to FIGS. 5A–B, there are illustrated flow charts depicting a method of detecting drive failures according to the preferred embodiment. The processes described below are preferably performed by routines stored in memory 222 and executed by the microcontroller 212, but alternatively, the process could be performed by dedicated hardware, or a combination of hardware and software as known to one of ordinary skill in the art of hardware design.

When a new command is received by the drive 118, the command block 300 is parsed to determine which command has been received. Although the drive 118 is capable of responding to at least the ATA command set, for simplicity those ATA commands are not shown. At a step 500, the microcontroller 212 reads the command block and proceeds to step 502. At steps 502–510, the microcontroller determines which command has been received.

In general, after the commands have been identified in steps 502–510, the process continues to steps 512–520 where the microcontroller 212 records the command in the error log data structure 416 for the purpose of tracking command history, as discussed above with reference to FIG. 4D. Preferably, the error log data structure 416 is temporarily created in memory 220 before being written to the drive 118. This helps minimize the impact to drive performance. Alternatively, the error log data structure 416 could be stored in other volatile or non-volatile memories, such as a FIFO (first-in-first-out) memory; a writable non-volatile memory, such as electrically erasable programmable read only memory (EEPROM), or an alternate sector on the drive 118. The information recorded includes the values identified in the command data structure 418. At the time the command is recorded, the microcontroller 212 preferably also records the time that the command was issued by the host. As another variation, the command could be recorded after execution of the command.

SMART commands are distinguishable from other commands by a "B0h" command code, as shown in FIG. 3A. SMART commands are distinguishable from each other by a subcommand value written into the features register 302.

At step 502, if the microcontroller determines that the SMART subcommand is a "D0h," the microcontroller 212 proceeds to step 512 to record the command and onto step 522 where a SMART read attribute values command is executed. At step 522, the microcontroller 212 returns the drive's 118 attribute values to the host. If at step 502, the microcontroller determines that the command is not a "D0h," the process continues to step 504.

At step 504, if the microcontroller determines that the SMART subcommand is a "D4h," the microcontroller 212 proceeds to step 514 to record the command and onto step 524 to execute an off-line data collection immediate command, discussed below. The off-line data collection immediate command causes the drive 118 to complete an off-line read scan of the entire drive 118. If at step 502, the microcontroller determines that the command is not a "D4h," the process continues to step 506.

At step 506, if the microcontroller determines that the SMART subcommand is a "D5h," the microcontroller 212 proceeds to step 516 to record the command and onto step 526 to execute a read logging sectors command. At step 526, the microcontroller 212 returns the drive's 118 error logging sector data structure 410 to the host. If at step 506, the microcontroller determines that the command is not a "D5h," the process continues to step 508.

At step 508, if the microcontroller determines that the SMART subcommand is a "DBh," the microcontroller 212 proceeds to step 518 to record the command and onto step 528 to execute an enable/disable automatic off-line data collection command. This subcommand enables and disables the drive 118 to perform data collection activities that automatically collect attribute data in an off-line mode. If at step 508, the microcontroller determines that the command is not a "D0h," the process continues to step 510.

At step 510, if the microcontroller determines that a command other than one of the above four SMART subcommands has been issued, the microcontroller 212 proceeds to step 520 to record the command and onto step 530 to execute the command.

After the commands have been executed in steps 522–530, processing continues to step 532 (FIG. 5B) where the microcontroller determines if an error has occurred in the execution of the subject command. Errors are determined in a number of ways including, reading the status register 317. If an error has occurred, processing continues to step 534 where the microcontroller 212 records the error in the error log data structure 416 of memory 220. The error information recorded includes the values identified in the error data structure 420. When the error is recorded, the microcontroller 212 also records the time that the error was detected and the state of the drive 118. Processing continues from step 534 to step 536 where the microcontroller causes an ATA device error counter to be incremented. The ATA device error count is a number representing the total number of errors recorded during the life of the drive 118.

After updating the error data structure 420 in memory 220, the microcontroller proceeds to step 538 where the error log data structure 416 is copied to a non-volatile memory according to the error logging data structure 410. Preferably, the non-volatile memory is an error logging sector 230 of the drive 118, but other forms of non-volatile memory could be used. A second copy is made for fault tolerance purposes. The processing continues from step 538 to step 540 where the microcontroller updates the error log data structure pointer 414 according to the address where the error logging data structure 410 was written.

If in step 532 an error is not detected or if step 540 is complete, processing continues to step 542 where the microcontroller 212 causes a drive inactivity detector to reset. The drive inactivity detector is preferably a timer maintained by the microcontroller 212 for counting time between commands. When a command is received the timer is reset. If no commands are received, the timer continues to count seconds until a predetermined count is achieved and the drive 18 is deemed inactive. The performance of this step is not limited to the period of time after errors are detected—it could be performed anytime after a command is received. More details on usage of the timer are found with reference to FIG. 7.

Once the commands have been executed, the microcontroller 212 waits for another command and processes various background housekeeping tasks. One of these tasks is further described in FIG. 7 below.

Figure 6:
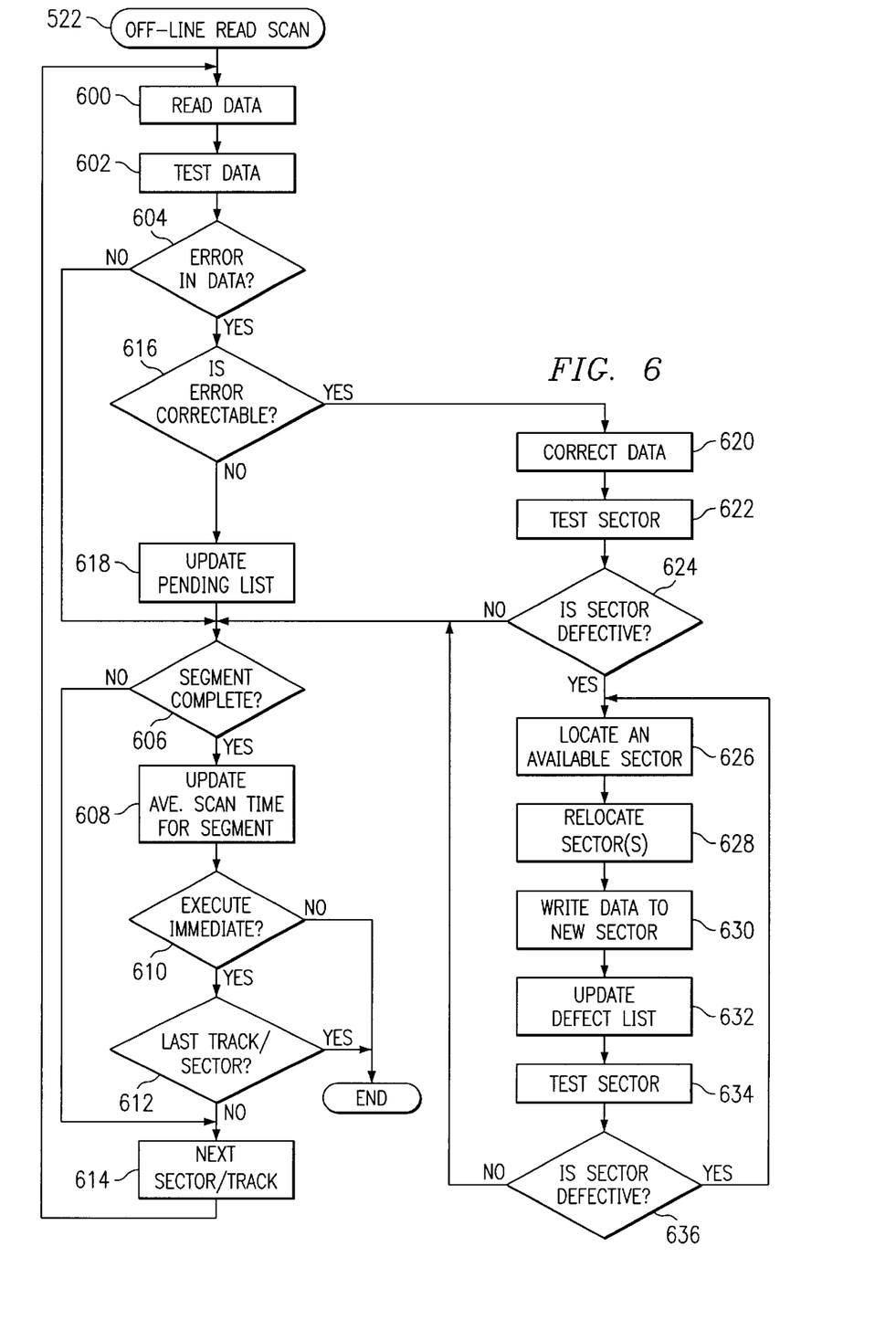
FIG. 6 is a flow chart illustrating an off-line read scan operation, according to the preferred embodiment.

Now referring to FIG. 6 there is illustrated a flow chart depicting a method of performing the off-line read scan technique according to the preferred embodiment. At a step 600, the microcontroller 212 begins by reading data from the drive 118. Preferably, at least a sector's worth of data, including the error checking bytes, is retrieved. Typically, to read a single sector, the drive 118 reads a track's worth of data even though only one sector is sought. At a step 602, the microcontroller 212 tests the data against its error checking codes according to conventional or proprietary error checking techniques, such as Reed-Solomon ECC with double and quadruple burst correction algorithms.

At step 604, the microcontroller examines the results of step 602 to determine if the data contained an error. If the data does not contain an error, processing continues to a step 606 where the microcontroller 212 determines whether the segment is complete. Recall that a segment is a convenient predetermined portion of the total number of sectors of the drive 118, such as the number of sectors contained in a track or cylinder. If the segment is not complete, processing continues to a step 614 where the next sector and/or track is selected. If at step 606 the segment is determined to be complete, processing continues to a step 608 where the microcontroller 212 calculates the elapsed time to scan the completed segment. The elapsed time value is written into the total time to complete next segment field 328. The preferably represents an average of the previously stored value and the newly calculated value, but alternatively the value can represent the elapsed time for the last segment scanned.

Processing continues from step 608 to step 610 where the microcontroller 212 determines whether the read scan is the result of an execute immediate read scan command. If so, then the entire drive 118 must be scanned and processing continues to a step 612. If not so, then the read scan operation is deemed to be a background task which is terminated after the segment is finished.

At step 612, the microcontroller 212 determines if the last sector has been read. If so, then the read scan is complete. If not so, processing continues to a step 614 where the next sector is selected before returning to step 600 to inspect the sector. It should be noted that segment boundaries are conveniently chosen to coincide with track/cylinder boundaries so that step 612 is inherent within step 606.

If at step 604 the microcontroller 212 determines that an error is contained in the data, processing continues to a step 616 where the microcontroller 212 determines whether the error is correctable. If not so, processing continues to a step 618 where the drive defect pending list is updated to include the sector containing the uncorrectable data. If the error is correctable, processing continues to a step 620 where the data is corrected and rewritten to the sector. Processing continues to step 622 where the sector is tested again to see if any errors are indicated. Sector testing can involve a number of read and write cycles to see if the error is repeatable.

At step 624, the microcontroller 212 determines if the sector is defective. If the error repeats after one or more rereads and rewrites, the microcontroller deems the sector defective and processing continues to a step 626. If the error does not repeat, processing continues to step 606.

At step 626, the microcontroller locates an available sector to reallocate the defective sector. The microcontroller 212 looks for available sectors in areas such as pools of spare sectors or unused sectors. Once an available sector is located, processing continues to a step 628 where the microcontroller 212 relocates the old sector to the new sector. Processing continues from step 628 to step 630 where the microcontroller 212 writes the data into the new sector. Processing continues to step 632 where the microcontroller 212 updates the defect pending list to include the defective sector. Processing continues to step 634 where the microcontroller 212 tests the new sector to make sure the data is read correctly.

At step 636, the microcontroller 212 determines if the sector is defective. If an error repeats after one or more rereads and rewrites, the microcontroller 212 deems the sector defective and processing returns back to step 626 to select another sector. If an error is not present or does not repeat, processing continues to step 606 to continue scanning.

Figure 7:
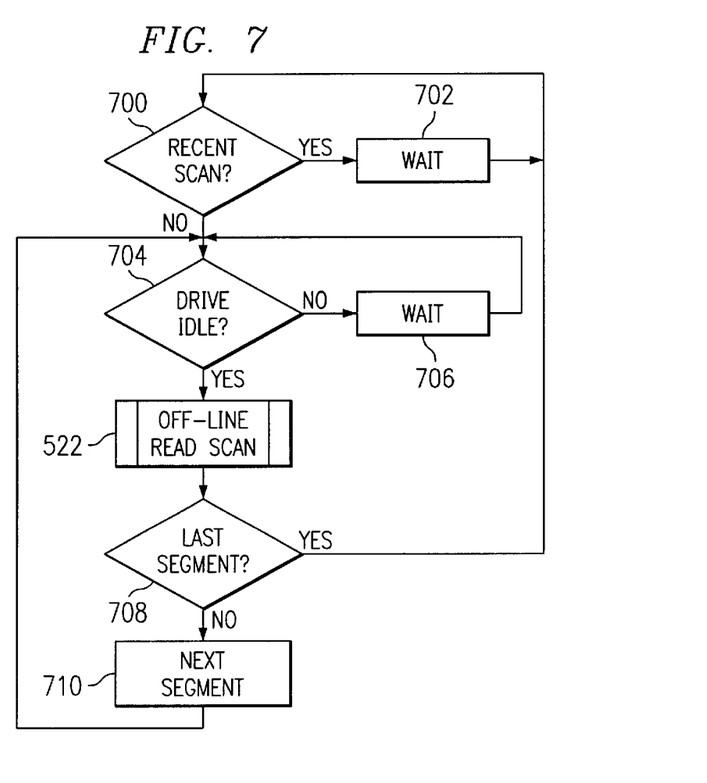
FIG. 7 is a flow chart illustrating a background routine for triggering an off-line read scan operation, according to the preferred embodiment.

Now referring to FIG. 7, there is illustrated a flow chart depicting a background or idle task of the microcontroller 212. At a step 700, the microcontroller 212 determines if a scan has been performed recently. The drive 118 is scanned according to a predetermined frequency of at least once a week and preferably once every number of active hours, such as eight hours of activity or usage. The drive 118 is deemed active when the platters are spinning. Alternatively, activity could be based on on-time. If the drive 118 has been scanned within the last activity period (such as eight hours), processing continues to a step 702 where the microcontroller 212 waits for a predetermined period of time, such as one minute, before proceeding back to step 700 to test again.

If at step 700, the microcontroller 212 determines that a scan has not been performed recently in accordance with the frequency schedule, processing continues to a step 704 where the microcontroller 212 determines if the drive 118 is inactive or idle (not executing host-initiated commands). It is preferable to perform the background read scanning while the drive 118 is not being used. Periods of inactivity can exist for as little as microsecond and for as long as hours. Typically, the longer the drive 118 is idle, the higher the probability that the drive will remain idle. The microcontroller uses a predetermined timeout value, such as 15 seconds, to detect when the drive is idle. If at step 704 the microcontroller 212 determines that the drive 118 is idle, processing continues to step 522 where an off-line read scan is performed for one or more segments. Preferably the off-line read scan is performed during an idle period but before the drive 118 is placed into a low power state, such as when the drive is spun down.

After an off-line read scan is performed, processing continues to a step 708 where the microcontroller 212 determines if the last segment has been scanned. If so, processing continues back to step 700 to wait for the next scheduled scan. If all segments have not yet been scanned, then processing continues to a step 710 where the next segment is selected and processing continues to step 704 to check for drive inactivity.

Although FIG. 7 shows a process where the microcontroller branches out of the off-line read scan after scanning each segment, alternatively the scanning can continue (without branching back to step 704) until the drive 118 receives a command. As another variation, the polling performed by the microcontroller 212, such as with the timers, can be performed by separate hardware providing interrupts to the microcontroller 212.

Thus there has been described and illustrated herein, method and apparatus for logging errors in a storage device. However, those skilled in the art should recognize that many modifications and variations in the size, shape, materials, components, circuit elements, wiring connections and contacts besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A storage device suitable for communicating with a host, comprising:
   a non-volatile memory; and
   a controller for executing commands received from the host, the controller operable to develop a list of previously executed commands according to the commands received, the controller further operable to associate an error with a command in response to an error detected by the storage device during the command execution, to capture a set of error conditions associated with the command execution, and for each detected error to store from the list, commands preceding and including the command during which the error was detected and the captured set of error conditions collectively as a log entry in the non-volatile memory, whereby an error log comprising error log entries for respective detected errors is created in the non-volatile memory for transfer for storage by another memory, and wherein
      in response to retrieve commands the controller is operable to return stored log entries to the host.

2. The storage device of claim 1, wherein a predetermined number of error logs are stored in the non-volatile memory.

3. The storage device of claim 1, wherein a predetermined number of commands executed prior to the command associated with the detected error is maintained.

4. The storage device of claim 1, wherein the controller is further operable to store a time indication of when each command was received by the storage device.

5. The storage device of claim 1, wherein the controller is further operable to store a time indication of when the error was detected by this storage device.

6. The storage device of claim 1, wherein the storage device is capable of operating in a number of states and wherein the controller is further operable to store the operating state of the storage device at the time of detection of an error.

7. The storage device of claim 1, wherein the controller is further operable to maintain an error count as part of the error log.

8. A computer system, comprising:
   a processor;
   a storage device coupled to said processor, including:
      a non-volatile memory; and
      a controller for executing commands received from the host, the controller operable to develop a list of previously executed commands according to the commands received, the controller further operable to associate an error with a command in response to an error detected by the storage device during the command execution, to capture a set of error conditions associated with the command execution, and to store the list and the set of error conditions as an error log entry in the non-volatile memory, thereby to create in said non-volatile memory, prior to transfer to another memory for storage, an error log comprising error log entries for respective detected errors; and wherein
         in response to a command the controller is operable to return stored error log entries to the host.

9. The computer system of claim 8, wherein a predetermined number of error logs is stored in the non-volatile memory.

10. The computer system of claim 8, wherein the controller is further operable to store a time indication of when each executed command was received by the storage device.

11. The computer system of claim 8, wherein the controller is further operable to store a time indication of when each error was detected by this storage device.

12. The computer system of claim 8, wherein the storage device is capable of operating in a number of states and wherein the controller is further operable to store the operating state of the storage device on detection of an error.

13. The computer system of claim 8, wherein the controller is further operable to maintain an error count as part of the error log.

14. A storage device, comprising:
   a mass storage medium;
   a microcontroller operable to receive and execute storage device commands, the controller operable to develop a list of previously executed commands according to the commands received, to associate an error detected by the storage device with a command during execution of which said error was detected, and to capture a set of error conditions associated with said detected error, and for each detected error, to create an error log entry in an error log in the mass storage medium, each error log entry comprising the command during which the detected error occurred, a predetermined number of said previously executed commands, and said set of error conditions associated with said detected error; and wherein
      in response to retrieve commands the controller is operable to retrieve stored error log entries.

15. The storage device of claim 14, wherein the storage device is a hard disk drive.

16. The storage device of claim 14, wherein the mass storage medium is a magnetic platter.

17. A storage device for communicating with a processor, comprising:
   a mass storage device;
   a non-volatile memory; and
   a controller arrangement operably coupled to the mass storage device to execute processor commands, wherein the controller arrangement is operably configured to store in the controller memory a list of executed processor commands together with information associated with each executed command; the controller arrangement is operably configured to detect errors in processor command execution and for each detected error to capture and store as an error log entry in said controller memory a predetermined number of commands executed prior to the command which gave rise to the detected error and a set of error conditions associated with that detected error, and to correlate each stored set of error conditions to the executed processor command which gave rise to the detected error, thereby compiling an error log comprising a plurality of said error log entries; and wherein in response to commands the controller is operable to return stored error log entries to the processor.

18. The storage device of claim 17, wherein captured sets of error conditions associated with respective ones of a predetermined number of detected errors are stored in a buffer in said controller memory.

19. A computer system, comprising:

a processor;

a mass storage device coupled to the processor;

a controller arrangement operably coupled to the mass storage device to execute processor commands; and wherein:

the controller arrangement is operably configured to detect errors in processor command execution and to capture a set of error conditions associated with each detected error;

the controller arrangement also being operably configured to create and update an error log by storing in the mass storage device error log entries for detected errors, each error log entry including identification of the processor command during which an error was detected together with a list of prior executed processor commands and information associated with each executed command and each captured set of error conditions correlated to the executed processor command which gave rise to the detected error; and wherein in response to a command the controller arrangement is operable to return an error log entry to the processor.

20. The computer system of claim 19, further including a controller memory and wherein said controller arrangement is operable to store said error log entries initially in the controller memory and subsequently to transfer the said error log comprising a plurality of said error log entries to the mass storage device.

21. A computer system, comprising:

a processor;

a mass storage device coupled to the processor;

a controller arrangement operably coupled to the mass storage device to execute processor commands; and a controller memory;

the controller arrangement operably configured to detect errors in processor command execution and to capture a set of error conditions associated with each detected error;

the controller arrangement also being operably configured to create and store in the controller memory an error log including a plurality of error log entries, each error log entry a set of captured error conditions correlated to the executed processor command that gave rise to the detected error, and a list of prior executed processor commands, said captured error conditions including a storage location in the mass storage device associated with the processor command that gave rise to the detected error; and wherein the controller arrangement is operable to transfer the contents of said error log from the controller memory to the mass storage device for retention; and wherein in response to commands the controller arrangement is operable to return stored error log entries to the processor.

22. The computer system of claim 21, wherein each error log entry also includes one or more of (a) a time indication of execution of each processor command; (b) a time indication associated with the detection of an error, (c) an operating state of the mass storage device at the time of an error detection; and (d) a count of detected errors.

23. The computer system of claim 21, wherein error log entries associated with a predetermined number of detected errors are stored in a buffer in said controller memory.

24. The computer system of claim 23, wherein the buffer is a circular buffer.

* * * * *